Figure 1:
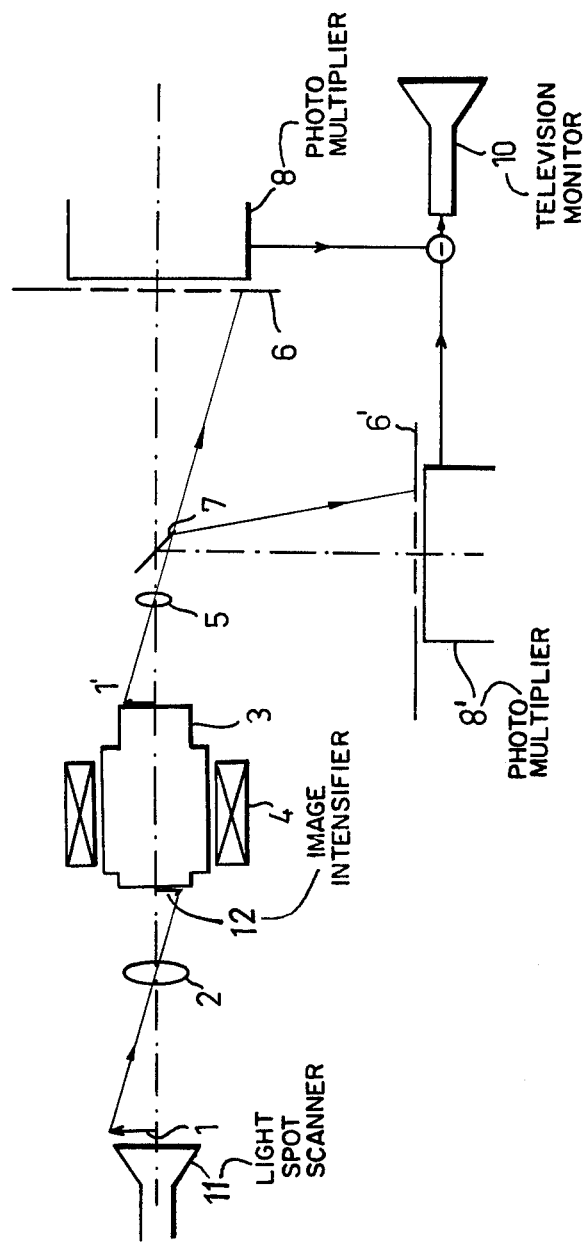

United States Patent [19]
Geluk

[11] 4,097,898
[45] Jun. 27, 1978

[54] METHOD AND APPARATUS FOR LINEARLY FILTERING TWO-DIMENSIONAL SIGNALS

[75] Inventor: Ronald Jan Geluk, Nootdorp, Netherlands

[73] Assignee: N. V. Optische Industrie "De Oude Delft", Delft, Netherlands

[21] Appl. No.: 755,790

[22] Filed: Dec. 30, 1976

[30] Foreign Application Priority Data

Jan. 8, 1976  Netherlands .......................... 7600155

[51] Int. Cl.² .......................... H04N 5/21; H04N 5/72
[52] U.S. Cl. .............................. 358/163; 324/77 K; 358/166; 358/253
[58] Field of Search ............... 358/163, 166, 217, 225, 358/237, 242, 250–253; 324/77 K, 77 R; 350/311

[56] References Cited

U.S. PATENT DOCUMENTS

| | | | |
|---|---|---|---|
| 2,205,504 | 6/1940 | Urtel | 358/163 |
| 2,905,757 | 9/1959 | James | 358/253 |
| 3,149,968 | 9/1964 | Stephens | 358/163 |
| 3,288,240 | 6/1968 | Robbins | 324/77 K |
| 3,609,235 | 10/1969 | Sawyer | 358/253 |
| 3,987,243 | 10/1976 | Schwartz | 358/225 |

*Primary Examiner*—Robert L. Richardson
*Attorney, Agent, or Firm*—O'Brien & Marks

[57] ABSTRACT

A method of linearly filtering spatially two-dimensional signals. The signal to be filtered is applied to an electronic imaging system. For providing a scanning movement, the signal is deflected in the electronic imaging system and swept over at least one mask in which a desired corrective filter function is established in the form of a specific transmission characteristic. The light passed by the mask is detected by means of at least one photodetector placed behind the mask. The output signal of the photodetector is a representation of the filtered two-dimensional signal as a function of the time.

7 Claims, 3 Drawing Figures

METHOD AND APPARATUS FOR LINEARLY FILTERING TWO-DIMENSIONAL SIGNALS

The invention relates to a method and apparatus for linearly filtering two-dimensional signals.

It is known that an image is a two-dimensional signal. Often it is important to be able to subject received image information to a filtering operation so as to eliminate distortions in the image, which may cause, for example, unsharpness of the image, or to provide beforehand a compensation for distortions occurring later. In this manner it is possible to enhance the image sharpness of, for example, space photographs, astronomic pictures, radar images and the like.

In various laboratories it has been tried to realize two-dimensional filtering, utilizing (laser) light. Such a method, however, entails a large number of problems which stands in the way of its use in practice.

In accordance with another method of two-dimensional filtering, the image is decomposed into a number of image points whose data are stored in an electronic memory, after which a filtered image is constructed by combining the stored data by means of a computer. A drawback inherent in this method is that a large memory capacity is required and that it takes a relatively long period of time before the result is available.

It is an object of the present invention to provide a method and apparatus in which the above drawbacks are absent.

To this end, in accordance with the present invention a method of the above type is characterized in that the signal to be filtered is applied to an electronic imaging system and, for providing a scanning movement, is deflected therein and swept over at least one mask in which a desired corrective filter function is established in the form of a specific transmission characteristic; and that the light passed by the mask is detected by means of at least one photodetector placed behind the mask, the output signal of the photodetector being a representation of the filtered two-dimensional signal as a function of the time.

Figure 2:
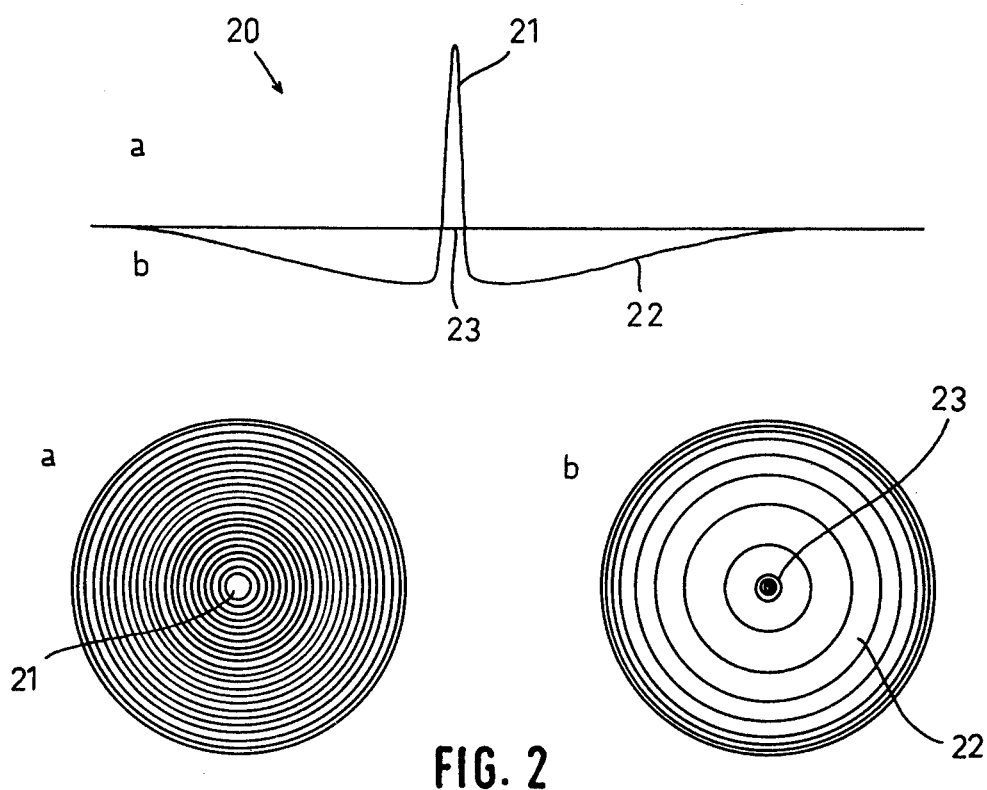
Figure 3:
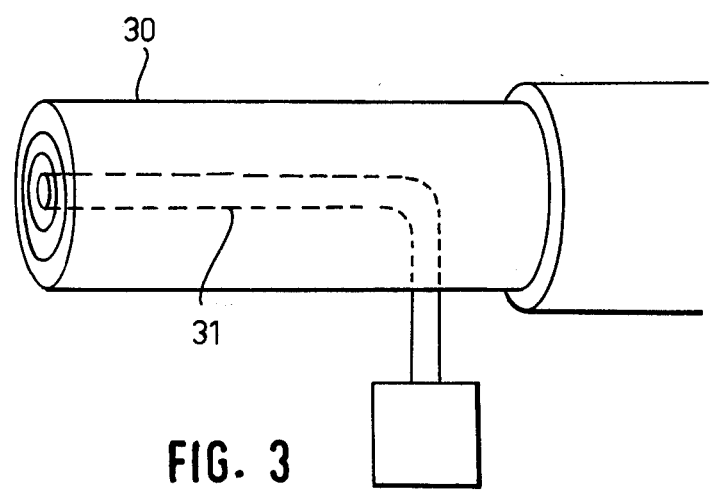

The invention will be described in greater detail hereinafter with reference to the accompanying drawings in which:

FIG. 1 schematically shows an apparatus embodying the present invention;

FIG. 2 shows a special form of a mask transmission function with associated positive and negative mask portions; and FIG. 3 shows a particular embodiment of a beam splitter.

FIG. 1 shows an object 1, which may be material body or an image, and which is projected through an optical system 2 upon the cathode of an electronic image intensifier 3. The intensifier forms an image 1' at the anode end.

The image intensifier 3 comprises deflection coils 4 which are energized so that the image 1' moves across the anode. It will be clear that the persistence of the phosphor of the anode should be so low that the successive image point brightnesses do not or hardly affect each other. A deflection raster as employed in television techniques may be used to advantage, so that the ultimate result can be directly reproduced on a television monitor.

The image intensifier 3 is followed by a schematically shown optical system 5 that is arranged for projecting the moving anode image upon masks 6 and 6', which masks provide the desired corrective filtering. The total translations of the image are at least as large as the full image height and image width respectively, so that each image element completely passes the operative portion of the mask. The image provided by the optical system 5 thus sweeps, across the mask so that all points of the image are scanned.

The mask can be manufactured in known per se manner, for example by photographic processes, and includes such a function that the desired filtering is obtained. The form of the filter function and hence the transmission characteristic of the mask depends on the nature of the distortion to be eliminated. If the mask transmission function is desired to have negative portions too, a second mask must be used for the negative portions. The positive portion can be realized in the usual manner. The negative portion of the transmission function is mirror-inverted with respect to the zero axis and this mirror-inverted function can then be realized in the usual manner too.

A beam splitter 7 is used in order to simultaneously project the deflected image on the two masks, which beam splitter is placed between the image intensifier and the masks. A photo-detector in the form of a photomultiplier tube 8,8' is placed behind each mask for detecting the light passed by the masks.

The thus-obtained output signals of photodetectors 8,8' are electronically subtracted from each other to provide a final result that corresponds to the image filtered by means of a mask having positive as well as negative portions.

When scanning in accordance with a television image raster, the resultant output signal can be reproduced on a television monitor 10 showing the desired filtered two-dimensional signal as a two-dimensional luminance distribution.

The use of optical system 5 is not strictly necessary but is preferred as it permits the use of large, manageable masks. If one or more beam splitters are used, however, such an optical system is necessary indeed. The optical system 5 may consist of a preferably high-speed microscope objective.

For obtaining a favourable signal-to-noise ratio, a relatively large tube current need flow in the image intensifier. This tube current may be less if only those image portions are illuminated that instantaneously correspond to the significant mask portion. To this end, if the two-dimensional signal is available in the form of a transparency, a projection tube 11 (FIG. 1) may be used whose light spot passes through the transparency. The light spot is moved across the cathode of the image intensifier so that this spot, after having again been deflected by the deflection coils 4, at all times completely includes the operative portion of the mask.

In the case of an illuminated part of the cathode image 12 of, for example, 10% of the image height and 10% of the image width, thus a hundred-fold reduction of the tube current in the luminance intensifier is achieved at the same signal-to-noise ratio.

A further possibility resulting in a lesser reduction of the tube current is that in which only a strip of the object is illuminated through a slot. The slot is moved in synchronism with, for example, the vertical deflection. A mechanical arrangement may be used for this purpose.

In the above it is assumed that a two-dimensional signal in the form of a photographic image is presented to the system. It is possible, however, to present a television image to the system. This television image may be synchronized to the scanning in the system. The persistence of the television screen should be such that the afterglowing part of the image includes at least the significant mask portion.

In a special case instance of the mask transmission function 20 (FIG. 2), this function has, for example, only one closed intersecting line 23 with the zero plane. In this case the beam splitter and the positive and the negative mask may be combined elegantly.

This is illustrated in FIG. 3 showing two light guides 30 and 31 which are concentric at the entrance end. No exchange of light is possible between these guides, while the inner one intersects the outer wall of the outer one at some distance from the entrance. Light guide 30 may be a Perspex rod including a bore which accommodates light guide 31, the latter being a bundle of optical fibres or also a Perspex rod.

A mask is mounted on the entrance of the outer light guide 30, which mask represents one polarity. The entrance of the inner light guide 31 includes the mask for the other polarity. The exits of the two light guides are each coupled to a photodetector.

It will be clear that in accordance with the above principle it is possible to combine more than two light guides having the entrances in a common plane.

The present invention may be used to advantage in the enhancement of the image sharpness of, for example, space photographs, aerial pictures, astronomic pictures, radar images and the like.

I claim:

1. A method of linearly filtering spatially a two-dimensional image comprising
    applying the two-dimensional image to an electronic image scanning system to generate a scanned image;
    dividing the scanned image into two scanned image portions;
    filtering the separate scanning image portions by two masks, respectively, one mask including the positive part of a desired filter function and the other mask including the negative part of a desired filter function;
    detecting the light passed through the masks by respective photodetectors to generate respective output signals;
    substracting one of the output signals from the other output signal to thereby generate a filtered signal; and
    reproducing the filtered signal into a filtered two-dimensional image.

2. A method as claimed in claim 1 wherein the dividing is performed by an otpical system including a beam splitter which projects respective beams on the two filters.

3. A method as claimed in claim 1 wherein the dividing is performed by an assembly of concentric light guides.

4. An apparatus for linearly filtering spatially a two-dimensional image comprising
    electronic image scanning means for converting the two dimensional image into a scanned image;
    means for dividing the scanning image into two separate scanned image portions;
    two masks, one mask including a positive part of a filter function and the other mask including a negative part of a filter function, interposed in the respective paths of the scanned image portions;
    two photodetectors behind the respective two masks to sense light transmitted therethrough; and
    reproducing means connected to the photodetectors so that one photodetector output is substracted from the other photodetector output for generating a filtered two-dimensional image.

5. An apparatus as claimed in claim 4 wherein the dividing means includes an optical system with a beam splitter for projecting the two scanned image portions on the respective masks.

6. An apparatus as claimed in claim 4 wherein the photodetectors are photomultiplier tubes.

7. An apparatus as claimed in claim 4 wherein the dividing means includes an assembly of light guides having different diameters and extending partly one inside another.

* * * * *